(12) United States Patent
Kanakarajan et al.

(10) Patent No.: US 10,397,047 B2
(45) Date of Patent: Aug. 27, 2019

(54) APPARATUS, SYSTEM, AND METHOD FOR SECURE REMOTE CONFIGURATION OF NETWORK DEVICES

(71) Applicant: Juniper Networks, Inc., Sunnyvale, CA (US)

(72) Inventors: Ravindranath C Kanakarajan, Bangalore (IN); Venkanna Thadishetty, Bangalore (IN)

(73) Assignee: Juniper Networks, Inc, Sunnyvale, CA (US)

( * ) Notice: Subject to any disclaimer, the term of this patent is extended or adjusted under 35 U.S.C. 154(b) by 0 days.

(21) Appl. No.: 15/898,207

(22) Filed: Feb. 15, 2018

(65) Prior Publication Data
US 2018/0176077 A1 Jun. 21, 2018

Related U.S. Application Data

(63) Continuation of application No. 14/594,062, filed on Jan. 9, 2015, now Pat. No. 10,038,591.

(51) Int. Cl.
*G06F 15/177* (2006.01)
*H04L 12/24* (2006.01)
(Continued)

(52) U.S. Cl.
CPC .............. *H04L 41/08* (2013.01); *H04L 9/005* (2013.01); *H04L 9/3247* (2013.01);
(Continued)

(58) Field of Classification Search
None
See application file for complete search history.

(56) References Cited

U.S. PATENT DOCUMENTS 7,941,379 B1 5/2011 Newstadt et al.
9,515,997 B1 12/2016 Westman et al.
(Continued)

OTHER PUBLICATIONS

Bhatt; Web Based Automation for Network Inventory Creation; http://www.esri.com/~/media/Files/Docs/events/telecom-2014/Web%20Based%20Automation%20for%20Network%20Inventory%20Creation%20%20Yestha%20Bhatt%20Reliance%20Jio%20Infocomm%20Limited, as accessed Nov. 18, 2014; Reliance Jio Infocomm Limited, ESRI UC, 2014.
(Continued)

*Primary Examiner* — Phyllis A Book
(74) *Attorney, Agent, or Firm* — FisherBroyles, LLP (57) ABSTRACT

The disclosed apparatus may include an encryption device that signs information exchanged between network devices to ensure the integrity of the information. The disclosed apparatus may also include a network device communicatively coupled to the encryption device, wherein the network device (1) obtains geo-location information that identifies the location of the network device, (2) directs the encryption device to sign the geo-location information to ensure the integrity of the geo-location information, (3) provides the signed geo-location information to a remote management system that manages the configuration of the network device based at least in part on the geo-location information, and (4) receives a configuration profile that modifies the configuration of the network device to account for the current location of the network device from the remote management system. Various other apparatuses, systems, and methods are also disclosed.

20 Claims, 6 Drawing Sheets

(51) Int. Cl.
  *H04L 9/32* (2006.01)
  *H04L 29/06* (2006.01)
  *H04W 64/00* (2009.01)
  *H04L 9/00* (2006.01)

(52) U.S. Cl.
  CPC ........ *H04L 9/3297* (2013.01); *H04L 41/0813* (2013.01); *H04L 41/0893* (2013.01); *H04L 41/28* (2013.01); *H04L 63/107* (2013.01); *H04L 63/123* (2013.01); *H04L 63/126* (2013.01); *H04L 63/20* (2013.01); *H04W 64/003* (2013.01)

(56) References Cited

U.S. PATENT DOCUMENTS

| | | | |
|---|---|---|---|
| 2007/0150299 A1* | 6/2007 | Flory | G06Q 10/10 705/51 |
| 2008/0031194 A1 | 2/2008 | Yaqub | |
| 2009/0276620 A1* | 11/2009 | McCarron | H04L 9/3271 713/155 |
| 2012/0102219 A1 | 4/2012 | Speckbacher et al. | |
| 2012/0214441 A1 | 8/2012 | Raleigh | |
| 2013/0198797 A1 | 8/2013 | Raghuram et al. | |
| 2014/0108792 A1 | 4/2014 | Borzycki et al. | |
| 2014/0122674 A1 | 5/2014 | Gray et al. | |
| 2014/0282877 A1* | 9/2014 | Mahaffey | H04L 63/0853 726/3 |
| 2015/0271155 A1* | 9/2015 | Ronca | H04L 63/0492 713/168 |
| 2015/0365436 A1 | 12/2015 | Shenefiel et al. | |
| 2016/0094669 A1 | 3/2016 | Karampurwala et al. | |
| 2017/0316217 A1* | 11/2017 | Smith | G06F 21/6209 |

OTHER PUBLICATIONS

Ravindranath C Kanakarajan, et al; Apparatus, System, and Method for Secure Remote Configuration of Network Devices; U.S. Appl. No. 14/594,062, filed Jan. 9, 2015.

Watsen; Zero Touch Provisioning for NETCONF Call Home (Zero Touch); http://tools.ietf.org/html/draft-ietf-netconf-zerotouch, as accessed Nov. 18, 2014; IETF Trust.

* cited by examiner

APPARATUS, SYSTEM, AND METHOD FOR SECURE REMOTE CONFIGURATION OF NETWORK DEVICES

CROSS REFERENCE TO RELATED APPLICATION

This application is a continuation of U.S. application Ser. No. 14/594,062 filed 9 Jan. 2015, the disclosure of which is incorporated, in its entirety, by this reference.

BACKGROUND

Many service providers manage and/or provide networks that include various network devices (such as routers and/or switches). As these networks become increasingly sophisticated, some service providers may customize certain network devices with specific policies and/or rules by way of remote configuration. For example, a centralized management server may generate and/or select a configuration profile for a specific router based at least in part on the location at which the router is installed. In this example, the configuration profile may include certain policies and/or rules to be applied by the router.

Unfortunately, traditional remote configuration may have certain inefficiencies and/or vulnerabilities. In one example, traditional remote configuration may involve time-consuming manual intervention, especially when the service providers' networks include a large number of network devices. For example, a service technician may need to manually report the device IDentifiers (IDs) and locations of various routers installed in a service provider's network to the centralized management server. Additionally or alternatively, certain routers installed in a service provider's network may report their device IDs and locations to the centralized management server by way of insecure communications.

The instant disclosure, therefore, identifies and addresses a need for additional and improved apparatuses, systems, and methods for secure remote configuration of network devices.

SUMMARY

As will be described in greater detail below, the instant disclosure generally relates to apparatuses, systems, and methods for secure remote configuration of network devices. In one example, an apparatus for accomplishing such a task may include an encryption device that signs information exchanged between network devices in order to ensure the integrity and/or authenticity of the information. The apparatus may also include a network device communicatively coupled to the encryption device. The network device may obtain geo-location information that identifies the current location of the network device and direct the encryption device to sign the geo-location information to ensure the integrity and/or authenticity of the geo-location information. The network device may then provide the signed geo-location information to a remote management system that manages the configuration of the network device based at least in part on the geo-location information. The network device may, in response to providing the signed geo-location information to the remote management system, receive a configuration profile that modifies the configuration of the network device to account for the location of the network device.

Similarly, a system incorporating the above-described apparatus may include a trusted platform module (TPM) that signs information exchanged between network devices in order to ensure the integrity and/or authenticity of the information. The system may additionally include a router communicatively coupled to the TPM. The router may obtain geo-location information that identifies the current location of the router and direct the TPM to sign the geo-location information in order to ensure the integrity of the geo-location information. The router may provide the signed geo-location information to a remote management system that manages the configuration of the router based at least in part on the geo-location information. The router may, in response to providing the signed geo-location information to the remote management system, receive a configuration profile that modifies the configuration of the router to account for the location of the router.

A corresponding method may include (1) obtaining geo-location information that identifies the current location of a network device, (2) directing an encryption device to sign the geo-location information in order to ensure the integrity of the geo-location information, (3) providing the signed geo-location information to a remote management system that manages the configuration of the network device based at least in part on the geo-location information, and then in response to providing the signed geo-location information to the remote management system, (4) receiving a configuration profile from the management system that modifies the configuration of the network device to account for the current location of the network device.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure describes various apparatuses, systems, and methods for secure remote configuration of network devices. As will be explained in greater detail below, embodiments of the instant disclosure may facilitate automatic and secure remote configuration of network devices without the need for manual intervention. For example, by providing digitally signed geo-location information to a remote management system, the various apparatuses, systems, and methods described herein may increase the efficiency, security, and ease of certain device installation procedures. Moreover, the various apparatuses, systems, and methods described herein may enable a management system to deny network access to fraudulent or malicious devices.

Figure 1:
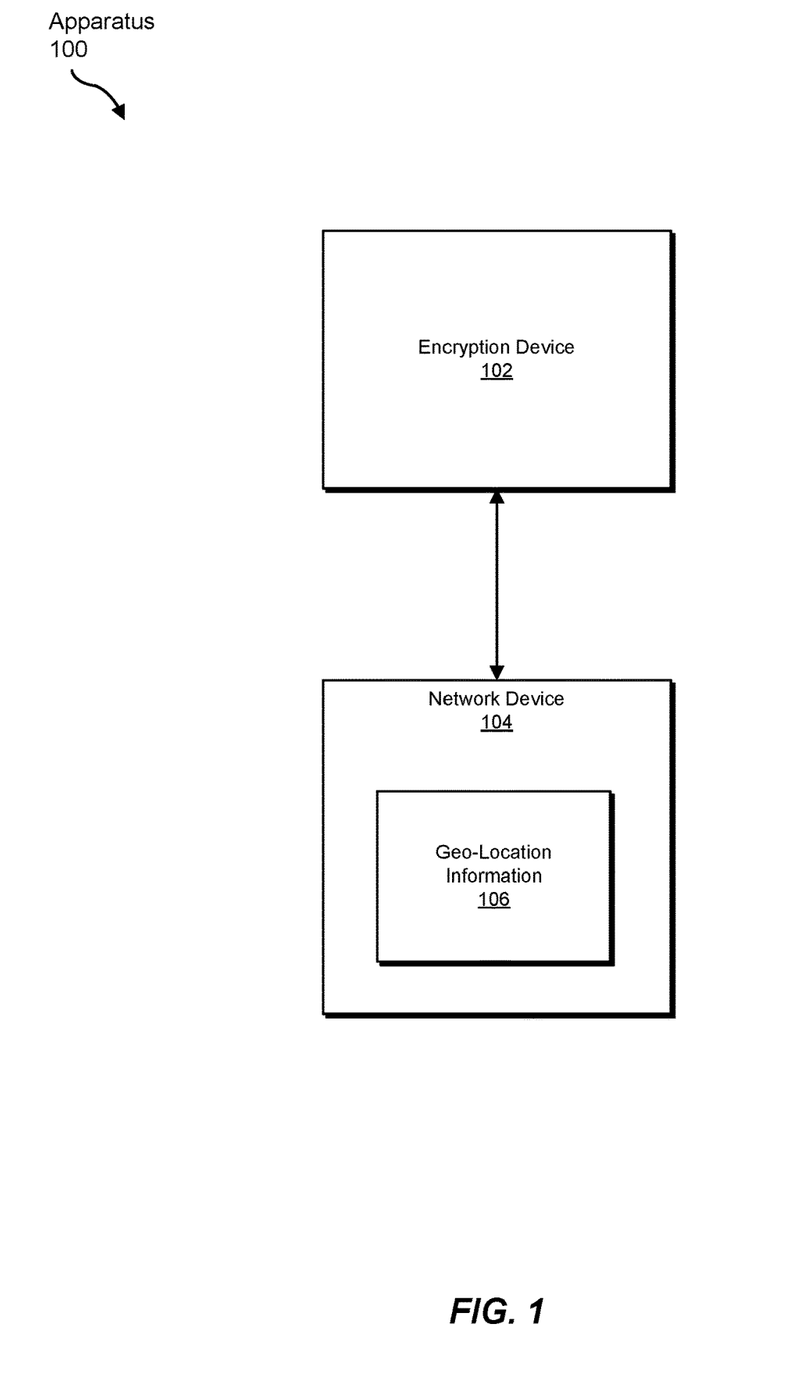
FIG. 1 is a block diagram of an exemplary apparatus for secure remote configuration of network devices.

The following will provide, with reference to FIG. 1, examples of apparatuses that facilitate secure remote configuration of network devices. The discussions corresponding to FIGS. 2, 3, and 4 will provide detailed descriptions of exemplary implementations of apparatuses and systems that facilitate secure remote configuration of network devices. An example of an exemplary method for secure remote configuration of network devices will be provided with reference to FIG. 5. Finally, the discussion corresponding to FIG. 6 will provide numerous examples of systems that may include the apparatus shown in FIG. 1.

FIG. 1 shows a block diagram of an exemplary apparatus 100 for secure remote configuration of network devices. The phrases "configuration" and "configuring," as used herein, generally refer to any type or form of process and/or procedure that modifies the operating parameters of a network device. In one example, a remote management system may, as part of a configuration process, assign an Internet Protocol (IP) address to a network device. In another example, the remote management system may configure a network device with a set of Class of Service (CoS) parameters that allow the network device to prioritize certain types of network traffic over other types of network traffic. By modifying the operating parameters of a network device in this way, the remote management system may enable the network device to properly operate and/or collaborate with other devices within a network.

As illustrated in FIG. 1, apparatus 100 may include a network device 104 communicatively coupled to an encryption device 102. The term "network device," as used herein, generally refers to any type or form of physical device, system, and/or mechanism that communicates with other devices, systems, and/or mechanisms over a network. In some examples, network device 104 may include and/or represent a server, router, or switch that facilitates communication between other servers, routers and/or switches. Additionally or alternatively, network device 104 may include and/or represent a server, router, or switch that facilitates communication among end-user devices (such as mobile devices and/or personal computers).

In other examples, network device 104 may include and/or represent a terminal network element (such as a set-top box and/or a network adapter within a mobile device and/or personal computer). Network device 104 may provide a variety of network services, such as packet routing, signal repeating, network address translation, and/or network interfacing. Examples of network device 104 include, without limitation, routers, switches, hubs, modems, bridges, repeaters, gateways, multiplexers, network adapters, portions of one or more of the same, variations of one or more of the same, combinations of one or more of the same, or any other suitable network device.

The term "encryption device," as used herein, generally refers to any type or form of device, system, and/or mechanism that performs cryptographic functions. Examples of cryptographic functions include, without limitation, public key encryption, applying digital signatures, variations of one or more of the same, combinations of one or more of the same, or any other suitable cryptographic functions. Encryption device 102 may be a dedicated integrated circuit designed specifically to execute one or more of these cryptographic functions. For example, encryption device 102 may include and/or represent a Trusted Platform Module (TPM). Additionally or alternatively, encryption device 102 may include and/or represent a general-purpose computing device that executes encryption software. In some cases, encryption device 102 may utilize a combination of dedicated integrated circuits and software to perform cryptographic functions.

In some examples, network device 104 may obtain geo-location information 106 that identifies the current location of network device 104. Network device 104 may obtain geo-location information 106 in a variety of ways. In one example, network device 104 may obtain geo-location information 106 from a geo-location device. For example, apparatus 100 may be incorporated in a router (not illustrated in FIG. 1) that includes an internal Global Positioning System (GPS) receiver. In this example, the GPS receiver may relay geo-location information 106 to network device 104. Accordingly, network device 104 may obtain geo-location information 106 from the internal GPS receiver.

The term "geo-location information," as used herein, generally refers to any type or form of information that identifies the real-world and/or physical location of an object. Geo-location information 106 may be absolute (e.g., using an established coordinate system) or relative (e.g., describing a location in terms of a known fixed point). Geo-location information 106 may be generated in a variety of ways. In some examples, geo-location information 106 may be generated by triangulating signals from remote points such as in the GPS. In other examples, geo-location information 106 may be calculated using time-difference-of-arrival methods that map a location based on signals from cell towers with known locations. Examples of geo-location information 106 include, without limitation, GPS coordinates, street addresses, relative distance from a known point, portions of one or more of the same, variations of one or more of the same, combinations of one or more of the same, or any other suitable mode of describing the real-world location of an object.

Additionally or alternatively, exemplary apparatus 100 may be incorporated in a router that has access to an external GPS receiver. In this example, apparatus 100 may be connected to the external GPS receiver via a Universal Serial Bus (USB) connection and/or a wireless communication connection. In these examples, network device 104 may obtain geo-location information 106 from the external GPS receiver.

In some embodiments, network device 104 may obtain geo-location information 106 during a boot-up process executed in response to a power-on event. For example, a service technician may install a router and provide the router with electrical power, causing the router to execute a first-time boot sequence. In certain embodiments, this boot sequence may include retrieving geo-location information 106 from a GPS receiver incorporated within the router and then providing geo-location information 106 to network device 104.

In some examples, network device 104 may direct encryption device 102 to digitally sign geo-location information 106. In other words, network device 104 may obtain a digital signature for geo-location information 106 from encryption device 102. By directing encryption device 102 to digitally sign geo-location information 106 in this way, network device 104 may be able to ensure the integrity of geo-location information 106.

The term "digital signature" and its derivatives, as used herein, generally refer to any type or form of digital representation that is derived from transmission data at a sender's side and used to verify the integrity and/or authenticity of that transmission data at a receiver's side. In one example, a digital signature may give a recipient reason to believe that certain transmission data was not altered during transmission. Digital signatures may be generated by specialized software and/or hardware (such as a TPM) using asymmetric encryption algorithms that produce a public key and a corresponding private key. For example, a signing algorithm may generate a digital signature by applying the private key to the information or a hash of the information that requires signing. Recipients of the digitally signed information may use a signature verification algorithm that either accepts or rejects a signature as authentic based at least in part on the information, the digital signature for the information, and/or the public key that corresponds to the private key used to generate the digital signature.

In some examples, digital signatures may give a recipient device reason to believe that the transmitting device is trustworthy. In one example, encryption device 102 may use an endorsement key. An endorsement key may include and/or represent a paired public encryption key and private encryption key that are randomly generated and then "burned" into an encryption device such that the encryption keys cannot be changed after the time of manufacture. Because the endorsement key, in this example, is generated during the manufacturing process, a management system may be able to store the endorsement key in a list that identifies trusted endorsement keys.

Additionally or alternatively, a management system may store a list of compromised and/or untrusted endorsement keys. In this example, encryption device 102 may use its private key to prove its identity by generating digital signatures for certain arbitrary data (such as randomly generated numbers). Other devices may use the public key associated with encryption device 102 to verify the authenticity of the digital signatures by comparing the signatures to those generated by trusted endorsement keys. For example, a remote management system may receive a request for a configuration profile and a digital signature from a network device along with the public key associated with the device. The remote management system may verify the digital signature using the public key and compare the digital signature to those generated by trusted endorsement keys. The remote management system may accept the request for a configuration profile only if the digital signature matches a digital signature generated by one of the trusted endorsement keys. This use of trusted keys may effectively enable the remote management system to "lock out" untrusted devices (such as third party GPS servers).

Network device 104 may provide the signed geo-location information to a remote management system that manages the configuration of network device 104. The term "management system," as used herein, generally refers to any type or form of device, system, and/or mechanism that enables an individual or organization to manage network devices within a network. Management systems may push different configuration profiles to network devices based at least in part on the statuses of the network devices. For example, a management system may utilize the physical location of a network device to maximize routing efficiency between various network devices within the network. In other examples, a management system may manage an international network of devices and push different configurations to devices in different countries to ensure that the network devices are compatible with local standards. In general, a management system may fulfill one or more of a variety of roles, such as identifying devices present on the network, monitoring device performance, monitoring overall network performance, configuring devices attached to the network, portions of one or more of the same, variations of one or more of the same, combinations of one or more of the same, or any other suitable network management operation.

As will be discussed in greater detail below, network device 104 may receive a configuration profile from a management system. The term "configuration profile," as used herein, generally refers to any type or form of file that modifies the operation of a network device and/or describes one or more settings to be applied to the network device. A configuration profile may contain a variety of information, such as an IP address that identifies network device 104, an IP address that identifies a Domain Name System (DNS) server, an IP address that identifies another server that provides information important to proper functioning of network device 104, routing tables that specify which physical interface should be used to forward information, authentication credentials, encryption keys, portions of one or more of the same, variations of one or more of the same, combinations of one or more of the same, or any other suitable information pertinent to the proper functioning of network device 104. Upon receiving a configuration profile from a management system, network device 104 may alter its internal settings to match the information included in the configuration profile.

As a specific example, network device 104 may receive a configuration profile that specifies the IP address of a preferred DNS server. Upon receiving the configuration profile, network device 104 may alter a corresponding internal setting (such as "preferred DNS server") to match the value included in the configuration profile.

Figure 2:
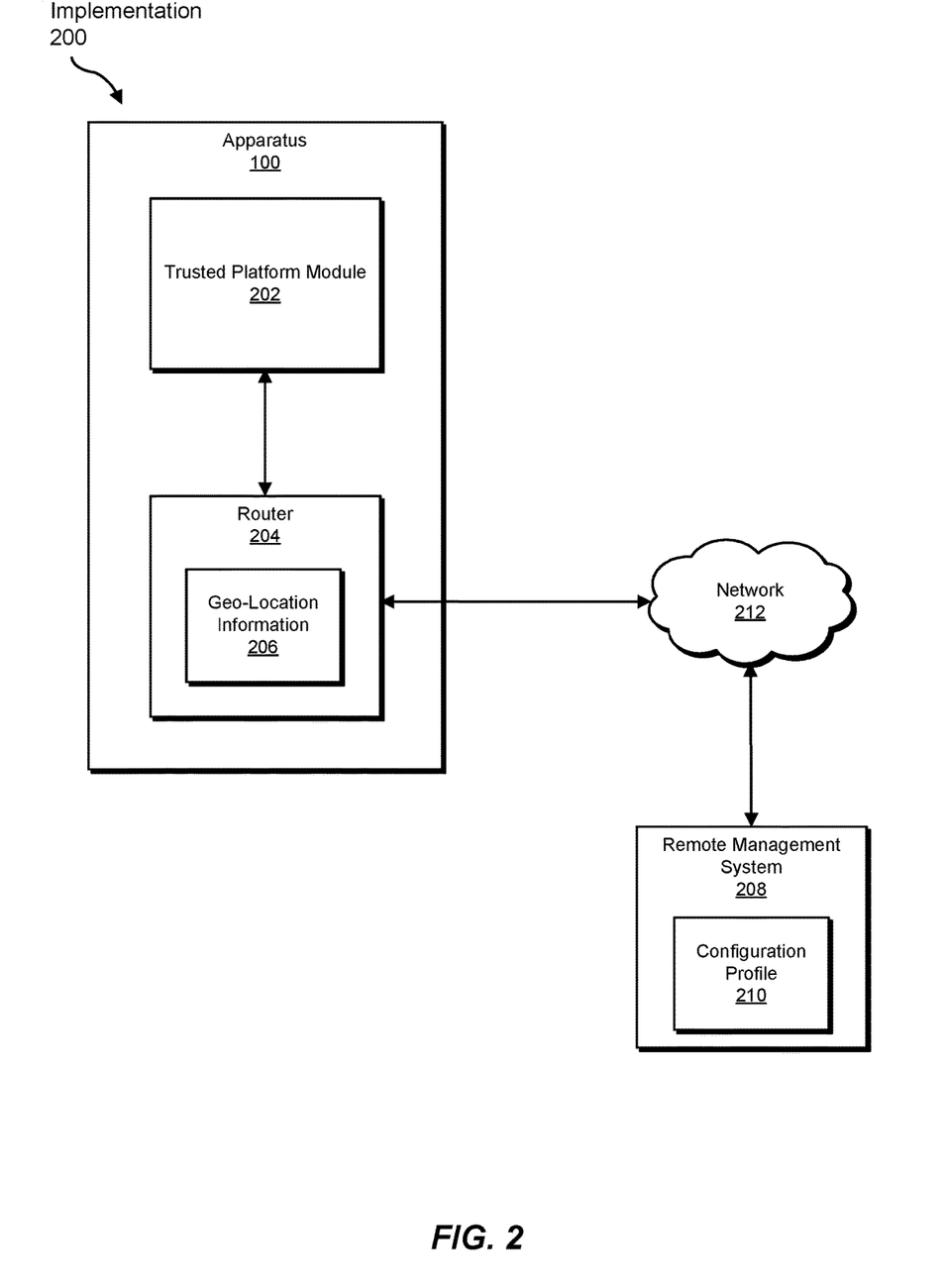
FIG. 2 is a block diagram of an exemplary implementation of an apparatus for secure remote configuration of network devices.

In one example, illustrated in FIG. 2, a remote management system 208 may manage the configuration of a router 204. In this example, router 204 may obtain geo-location information 206 that identifies the current location and then direct a trusted platform module 202 to digitally sign geo-location information 206. Router 204 may then transmit the digitally signed geo-location information 206 to remote management system 208 via network 212.

In some embodiments, network device 104 may additionally direct encryption device 102 to sign time information that identifies the current time and/or provide the signed time information to remote management system 208. Remote management system 208 may utilize the time information in a variety of ways. In one embodiment, remote management system 208 may be configured to enforce certain time-based security policies. For example, remote management system 208 may reject requests for configuration profiles that occur outside of an expected window of time (e.g., between the hours of 9:00 AM and 6:00 PM). In another embodiment, remote management system 208 may compare the provided time information to geo-location information 106.

As a specific example, remote management system 208 may use time information to prevent replay attacks. For example, an attacker may intercept the digitally signed geo-location information, make a copy of the data stream, and then "replay" the data stream to remote management system 208 in an attempt to authenticate a fraudulent device. However, remote management system 208 may reject the authentication attempt in the event that the time information provided as part of the data stream does not match the expected time information (e.g., in the event that the time information in the data stream is not reasonably close to the current time). In another example, remote management system 208 may receive geo-location information and time information from a network device claiming to be submitting the geo-location information at 8:00 PM. In this example, the management system may determine that the current time for the location of the network device is indeed approximately 8:00 PM and accordingly provide an appropriate configuration profile to the network device.

Network device 104 may receive a configuration profile from the remote management system in response to providing the signed geo-location information to the remote management system. The configuration profile may modify the configuration of network device 104 to account for the current location of network device 104. In some examples, remote management system 208 may include and/or represent a Dynamic Host Configuration Protocol (DHCP) server, and the configuration profile may include an Internet Protocol (IP) address. In these examples, the DHCP server may assign an IP address to a network device based at least in part on the physical location of the network device. For example, some organizations (such as universities) may require a DHCP to assign specific blocks of IP addresses to specific physical regions (such as student dormitories) as part of managing network resources. As a specific example illustrated in FIG. 2, router 204 may receive a configuration profile 210 from remote management system 208 in response to providing geo-location information 206 to remote management system 208.

As described above, a configuration profile may contain one or more settings to be applied to the device receiving the configuration profile. For example, router 204 may, upon receiving configuration profile 210 from remote management system 208, modify its internal settings to match certain values contained within configuration profile 210.

In some embodiments, network device 104 may be connected to an additional network device via a Local Area Network (LAN), and the configuration of the additional network device may be managed by the same management system that manages the configuration of network device 104. In these embodiments, network device 104 may act as a GPS anchor for the additional network device. The additional network device may utilize geo-location information 106 as obtained by network device 104 to facilitate receiving configuration profile 210 from remote management system 208. In some examples, the additional network device may request signed geo-location information from network device 104. Network device 104 may accordingly direct the encryption device to sign geo-location information 106 and then provide the signed geo-location information to the additional network device.

Figure 3:
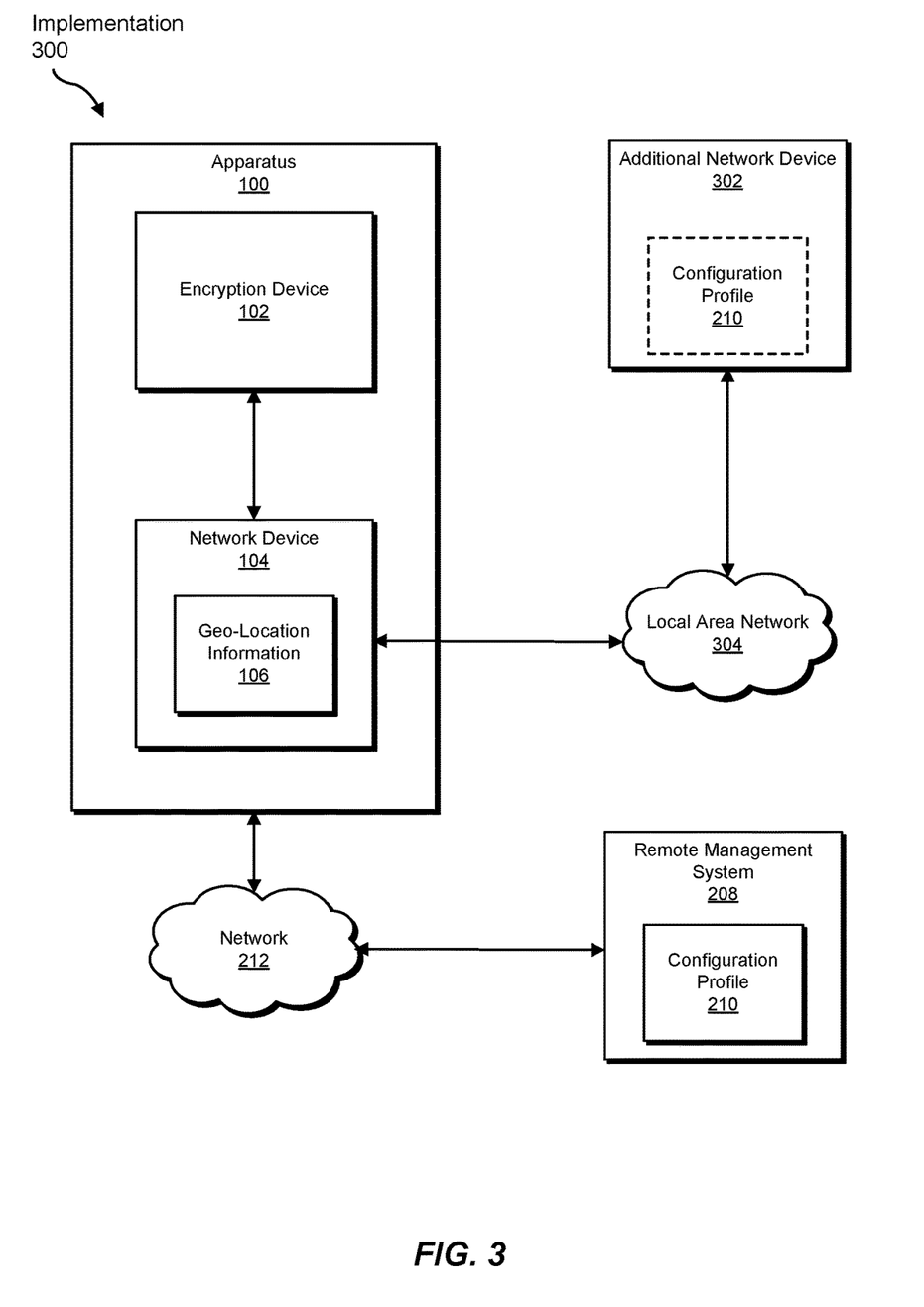
FIG. 3 is a block diagram of an additional exemplary implementation of an apparatus for secure remote configuration of network devices.

In one example illustrated in FIG. 3, an additional network device 302 may communicate with apparatus 100 via a local area network 304. In this example, remote management system 208 may manage and/or communication with both additional network device 302 and network device 104 via network 212. For example, additional network device 302 may request geo-location information 106 from network device 104. Network device 104 may accordingly direct encryption device 102 to digitally sign geo-location information 106 and then provide the signed geo-location information to additional network device 302. Additional network device 302 may then provide the signed geo-location information to remote management system 208 and receive configuration profile 210 in response to providing the signed geo-location information to remote management system 208.

Additionally or alternatively, network device 104 may function as a relay for configuring additional network devices. In these cases, network device 104 may append the signed geo-location information to every configuration request relayed through network device 104. For example, network device 104 may receive a unique identifier of additional network device 302 and then provide the unique identifier and the signed geo-location information to remote management system 208. In response, network device 104 may receive configuration profile 210 that accounts for the unique identifier and the geo-location information from management system 208 and then provide configuration profile 210 to additional network device 302.

More specifically, additional network device 302 may provide a unique identifier of additional network device 302 to network device 104 via LAN 304. Network device 104 may direct encryption device 102 to digitally sign geo-location information 106 and append the signed geo-location information to the unique identifier of additional network device 302. Network device 104 may then provide the unique identifier and signed geo-location information to remote management system 208 via network 212. Network device 104 may receive configuration profile 210 in response to providing the unique identifier and signed geo-location information to remote management system 208 and then provide configuration profile 210 to additional network device 302.

Upon receiving configuration profile 210, additional network device 302 may modify one or more of its internal settings to match information included in configuration profile 210. For example, configuration profile 210 may contain information that specifies a set of credentials used to access a portion of the network. As such, additional network device 302 may alter an internal list of credentials to reflect the credentials specified in configuration profile 210.

Figure 4:
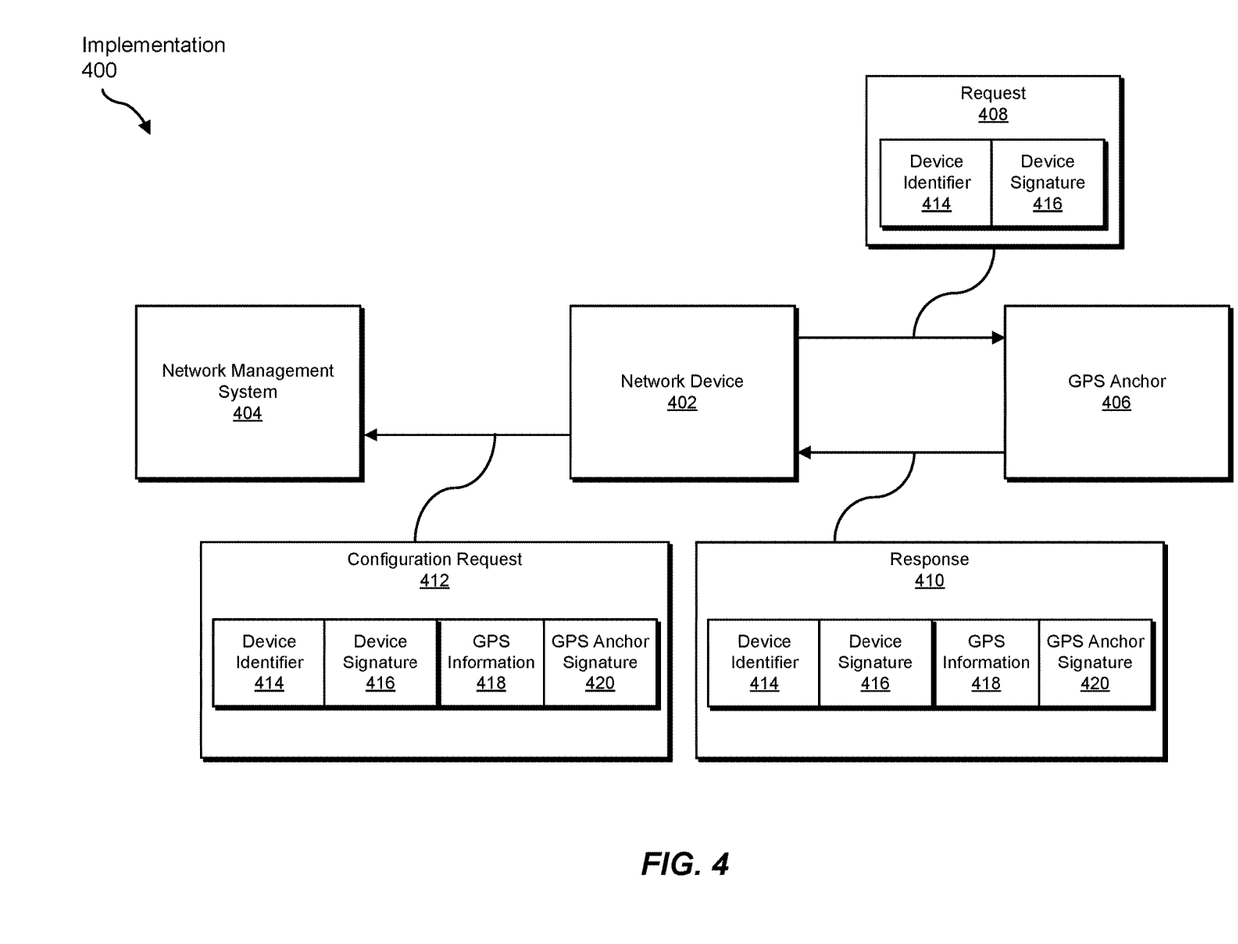
FIG. 4 is a block diagram of an additional exemplary implementation of a system for secure remote configuration of network devices.

In one example, a network device may use a GPS anchor as part of requesting a configuration profile from a network management system. FIG. 4 illustrates an exemplary implementation 400 in which a network device 402 may need to obtain signed geo-location information in order to properly request a configuration profile from a network management system. In this example, network device 402 may provide a request 408 for signed geo-location information to a GPS anchor 406. As illustrated in FIG. 4, request 408 may include a device identifier 414 that identifies network device 402. Network device 402 may optionally add a cryptographic nonce (not illustrated in FIG. 4) to request 408 to prevent replay attacks. Network device 402 may sign the entire message that includes device identifier 414 with a device signature 416.

In response to request 408, GPS anchor 406 may provide a response 410 to network device 402. As illustrated in FIG. 4, response 410 may include device identifier 414 and device signature 416 as provided by network device 402. Response 410 may additionally include GPS information 418 that describes the physical location of GPS anchor 406. Further, GPS anchor 406 may sign the entire message with a GPS anchor signature 420 to ensure the integrity of the information contained within response 410. In addition, GPS anchor 406 may use the optional cryptographic nonce from request 408 to prevent replay attacks.

Upon receiving response 410 from GPS anchor 406, network device 402 may use the information contained in response 410 to prepare a configuration request 412. As illustrated in FIG. 4, configuration request 412 may include device identifier 414, device signature 416, GPS information 418, the optional cryptographic nonce, and/or GPS anchor signature 420. Network device 402 may provide configuration request 412 to a network management system 404 as part of requesting a configuration profile from network management system 404. Alternatively, network device 402 may simply forward response 410 to network management system 404 as configuration request 410. In one example, network device 402 may send configuration request 412 to network management system 404 in a secure call-home operation using a Secure SHell (SSH) protocol and/or a Transport Layer Security (TLS) protocol.

Upon receiving configuration request 412 from network device 402, network management system 404 may validate configuration request 412 based at least in part on GPS anchor signature 420 to ensure that the information contained in configuration request 412 originated from a trusted GPS anchor. Additionally or alternatively, network management system 404 may validate configuration request 412 based at least in part on device identifier 414 and/or device signature 416 to ensure that request 408 provided to GPS anchor 406 originated from a trusted network device. Moreover, network management system 404 may use the optional cryptographic nonce included in configuration request 412 to prevent replay attacks.

As described above in connection with FIGS. 1-4, network devices may facilitate automatic, secure configuration by way of a remote management system without a need for manual intervention. By providing digitally signed geo-location information to a management system, these network devices may increase the efficiency and ease of device installation procedures. Moreover, these network devices may enable the management system to deny network access to fraudulent or malicious devices.

Figure 5:
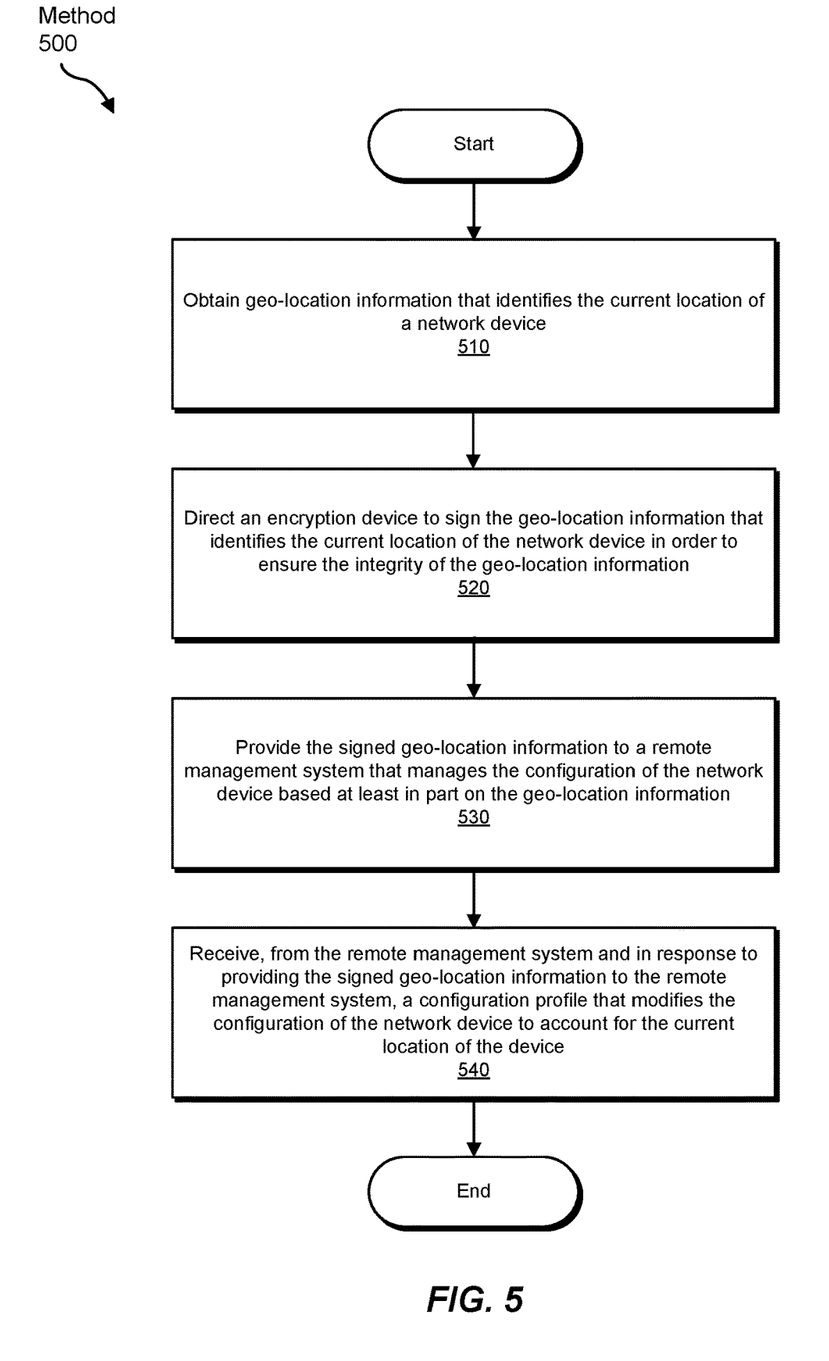
FIG. 5 is a flow diagram of an exemplary method for secure remote configuration of network devices.

FIG. 5 is a flow diagram of an exemplary method 500 for secure remote configuration of network devices. As illustrated in FIG. 5, method 500 may include the step of obtaining geo-location information that identifies the current location of a network device (510). This obtaining step may be performed in a variety of ways. For example, network device 104 may obtain geo-location information 106 from an internal GPS receiver. Additionally or alternatively, network device 104 may obtain geo-location information 106 from an external GPS receiver.

Returning to FIG. 5, method 500 may include the step of directing an encryption device to sign the geo-location information that identifies the current location of the network device in order to ensure the integrity of the geo-location information (520). This directing step may be performed in a variety of ways. For example, network device 104 may direct encryption device 102 to digitally sign geo-location information 106 in order to ensure the integrity of geo-location information 106. Additionally or alternatively, network device 104 may receive a request for signed geo-location information from additional network device 302 and then direct encryption device 102 to digitally sign geo-location information 106 on behalf of additional network device 302.

Returning to FIG. 5, method 500 may include the step of providing the signed geo-location information to a remote management system that manages the configuration of the network device based at least in part on the geo-location information (530). This providing step may be performed in a variety of ways. For example, router 204 may provide the digitally signed geo-location information to remote management system 208 via network 212. Additionally or alternatively, network device 104 may append the digitally signed geo-location information to a configuration request that originated from additional network device 302.

Returning to FIG. 5, method 500 may further include the step of receiving a configuration profile that modifies the configuration of the network device from the remote management system (540). The configuration profile may modify the configuration of the network device to account for the current location of the device. This receiving step may be performed in a variety of ways. For example, router 204 may receive configuration profile 210 from remote management system 208. Additionally or alternatively, receive configuration profile 210 on behalf of additional network device 302 and then relay configuration profile 210 to additional network device 302.

Figure 6:
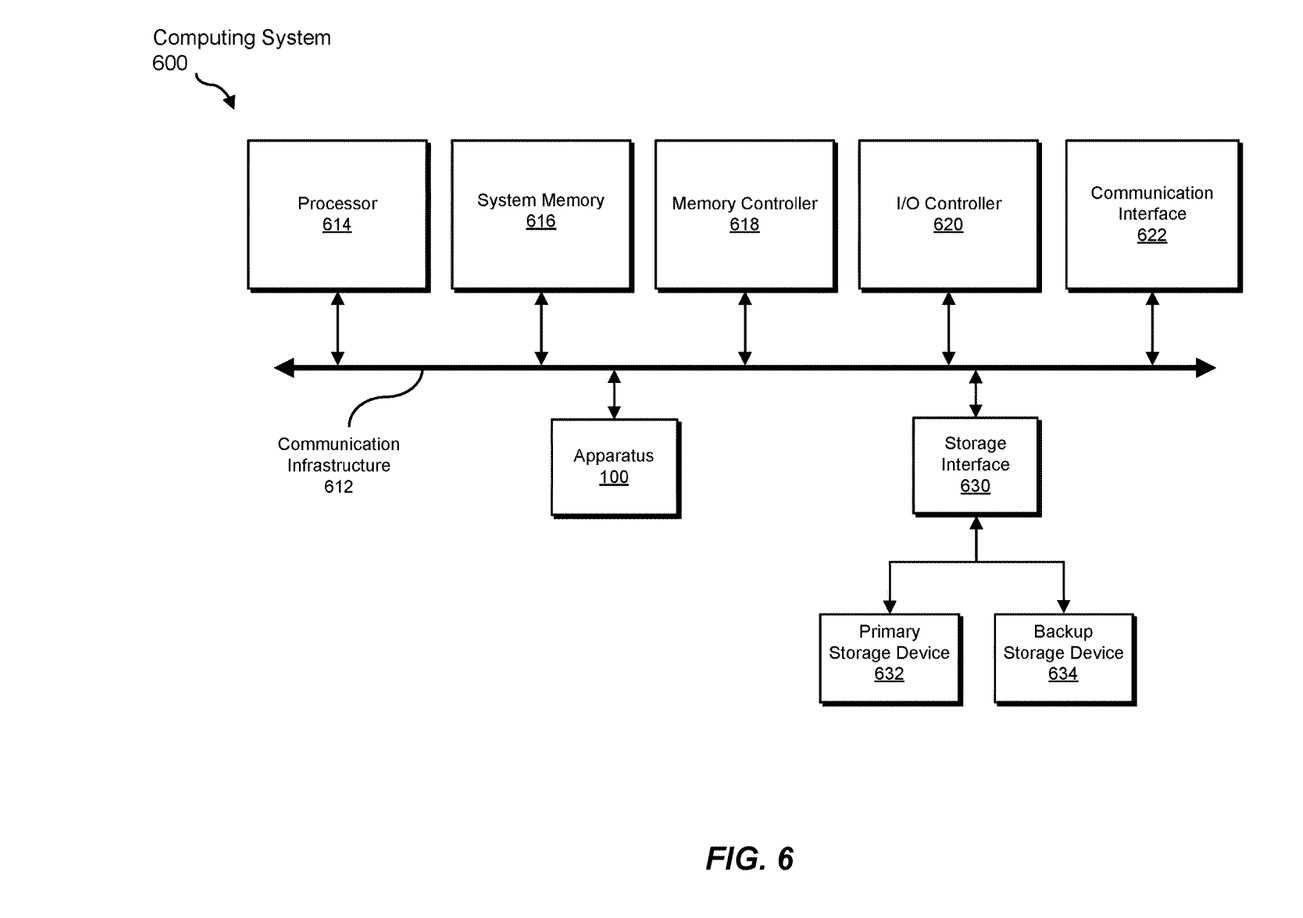
FIG. 6 is a block diagram of an exemplary computing system capable of implementing and/or being used in connection with one or more of the embodiments described and/or illustrated herein.

FIG. 6 is a block diagram of an exemplary computing system 600 capable of implementing and/or being used in connection with one or more of the embodiments described and/or illustrated herein. In some embodiments, all or a portion of computing system 600 may perform and/or be a means for performing, either alone or in combination with other elements, one or more of the steps described in connection with FIG. 5. All or a portion of computing system 600 may also perform and/or be a means for performing and/or implementing any other steps, methods, or processes described and/or illustrated herein. In one example, computing system 600 may include apparatus 100 from FIG. 1. As detailed above, apparatus 100 may computing system 600 to receive a configuration profile from a remote management server in response to providing the management server with digitally signed geo-location information.

Computing system 600 broadly represents any type or form of electrical load, including a single or multi-processor computing device or system capable of executing computer-readable instructions. Examples of computing system 600 include, without limitation, workstations, laptops, client-side terminals, servers, distributed computing systems, mobile devices, network switches, network routers (e.g., backbone routers, edge routers, core routers, mobile service routers, broadband routers, etc.), network appliances (e.g., network security appliances, network control appliances, network timing appliances, SSL VPN (Secure Sockets Layer Virtual Private Network) appliances, etc.), network controllers, gateways (e.g., service gateways, mobile packet gateways, multi-access gateways, security gateways, etc.), and/or any other type or form of computing system or device.

Computing system 600 may be programmed, configured, and/or otherwise designed to comply with one or more networking protocols. According to certain embodiments, computing system 600 may be designed to work with protocols of one or more layers of the Open Systems Interconnection (OSI) reference model, such as a physical layer protocol, a link layer protocol, a network layer protocol, a transport layer protocol, a session layer protocol, a presentation layer protocol, and/or an application layer protocol. For example, computing system 600 may include a network device configured according to a Universal Serial Bus (USB) protocol, an Institute of Electrical and Electronics Engineers (IEEE) 1394 protocol, an Ethernet protocol, a T1 protocol, a Synchronous Optical Networking (SONET) protocol, a Synchronous Digital Hierarchy (SDH) protocol, an Integrated Services Digital Network (ISDN) protocol, an Asynchronous Transfer Mode (ATM) protocol, a Point-to-Point Protocol (PPP), a Point-to-Point Protocol over Ethernet (PPPoE), a Point-to-Point Protocol over ATM (PPPoA), a Bluetooth protocol, an IEEE 802.XX protocol, a frame relay protocol, a token ring protocol, a spanning tree protocol, and/or any other suitable protocol.

Computing system 600 may include various network and/or computing components. For example, computing system 600 may include at least one processor 614 and a system memory 616. Processor 614 generally represents any type or form of processing unit capable of processing data or interpreting and executing instructions. For example, processor 614 may represent an application-specific integrated circuit (ASIC), a system on a chip (e.g., a network processor), a hardware accelerator, a general purpose processor, and/or any other suitable processing element.

Processor 614 may process data according to one or more of the networking protocols discussed above. For example, processor 614 may execute or implement a portion of a protocol stack, may process packets, may perform memory operations (e.g., queuing packets for later processing), may execute end-user applications, and/or may perform any other processing tasks.

System memory 616 generally represents any type or form of volatile or non-volatile storage device or medium capable of storing data and/or other computer-readable instructions. Examples of system memory 616 include, without limitation, Random Access Memory (RAM), Read Only Memory (ROM), flash memory, or any other suitable memory device. Although not required, in certain embodiments computing system 600 may include both a volatile memory unit (such as, for example, system memory 616) and a non-volatile storage device (such as, for example, primary storage device 632, as described in detail below). System memory 616 may be implemented as shared memory and/or distributed memory in a network device. Furthermore, system memory 616 may store packets and/or other information used in networking operations.

In certain embodiments, exemplary computing system 600 may also include one or more components or elements in addition to processor 614 and system memory 616. For example, as illustrated in FIG. 6, computing system 600 may include a memory controller 618, an Input/Output (I/O) controller 620, and a communication interface 622, each of which may be interconnected via communication infrastructure 612. Communication infrastructure 612 generally represents any type or form of infrastructure capable of facilitating communication between one or more components of a computing device. Examples of communication infrastructure 612 include, without limitation, a communication bus (such as a Serial ATA (SATA), an Industry Standard Architecture (ISA), a Peripheral Component Interconnect (PCI), a PCI Express (PCIe), and/or any other suitable bus), and a network.

Memory controller 618 generally represents any type or form of device capable of handling memory or data or controlling communication between one or more components of computing system 600. For example, in certain embodiments memory controller 618 may control communication between processor 614, system memory 616, and I/O controller 620 via communication infrastructure 612. In some embodiments, memory controller 618 may include a Direct Memory Access (DMA) unit that may transfer data (e.g., packets) to or from a link adapter.

I/O controller 620 generally represents any type or form of device or module capable of coordinating and/or controlling the input and output functions of a computing device. For example, in certain embodiments I/O controller 620 may control or facilitate transfer of data between one or more elements of computing system 600, such as processor 614, system memory 616, communication interface 622, and storage interface 630.

Communication interface 622 broadly represents any type or form of communication device or adapter capable of facilitating communication between exemplary computing system 600 and one or more additional devices. For example, in certain embodiments communication interface 622 may facilitate communication between computing system 600 and a private or public network including additional computing systems. Examples of communication interface 622 include, without limitation, a link adapter, a wired network interface (such as a network interface card), a wireless network interface (such as a wireless network interface card), and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a wide area network, a private network (e.g., a virtual private network), a telephone or cable network, a cellular telephone connection, a satellite data connection, or any other suitable connection.

In certain embodiments, communication interface 622 may also represent a host adapter configured to facilitate communication between computing system 600 and one or more additional network or storage devices via an external bus or communications channel. Examples of host adapters include, without limitation, Small Computer System Interface (SCSI) host adapters, Universal Serial Bus (USB) host adapters, IEEE 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 622 may also enable computing system 600 to engage in distributed or remote computing. For example, communication interface 622 may receive instructions from a remote device or send instructions to a remote device for execution.

As illustrated in FIG. 6, exemplary computing system 600 may also include a primary storage device 632 and/or a backup storage device 634 coupled to communication infrastructure 612 via a storage interface 630. Storage devices 632 and 634 generally represent any type or form of storage device or medium capable of storing data and/or other computer-readable instructions. For example, storage devices 632 and 634 may represent a magnetic disk drive (e.g., a so-called hard drive), a solid state drive, a floppy disk drive, a magnetic tape drive, an optical disk drive, a flash drive, or the like. Storage interface 630 generally represents any type or form of interface or device for transferring data between storage devices 632 and 634 and other components of computing system 600.

In certain embodiments, storage devices 632 and 634 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 634 may also include other similar structures or devices for allowing computer software, data, or other computer-readable instructions to be loaded into computing system 600. For example, storage devices 632 and 634 may be configured to read and write software, data, or other computer-readable information. Storage devices 632 and 634 may be a part of computing system 600 or may be separate devices accessed through other interface systems.

Many other devices or subsystems may be connected to computing system 600. Conversely, all of the components and devices illustrated in FIG. 6 need not be present to practice the embodiments described and/or illustrated herein. The devices and subsystems referenced above may also be interconnected in different ways from those shown in FIG. 6. Computing system 600 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives and floppy disks), optical-storage media (e.g., Compact Disks (CDs) and Digital Video Disks (DVDs)), electronic-storage media (e.g., solid-state drives and flash media), and other distribution systems.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of apparatus 100 in FIG. 1 may represent portions of a cloud-computing or network-based environment. Cloud-computing and network-based environments may provide various services and applications via the Internet. These cloud-computing and network-based services (e.g., software as a service, platform as a service, infrastructure as a service, etc.) may be accessible through a web browser or other remote interface. Various functions described herein may also provide network switching capabilities, gateway access capabilities, network security functions, content caching and delivery services for a network, network control services, and/or and other networking functionality.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. An apparatus comprising:
   an encryption device that signs information exchanged between network devices to ensure the integrity of the information; and
   a network device communicatively coupled to the encryption device, wherein the network device:
   obtains geo-location information that identifies a current location of the network device;
   directs the encryption device to sign:
      the geo-location information that identifies the current location of the network device to ensure the integrity of the geo-location information; and
      time information that identifies a current time at the current location of the network device;
   provides the signed geo-location information and the signed time information to a remote management system that manages the configuration of the network device by:
      verifying the authenticity of the signed geo-location information;
      verifying the authenticity of the signed time information by determining that the current time identified in the signed time information is consistent with a current time at the current location of the network device; and
      in response to verifying the authenticity of the signed geo-location information and the signed time information:
         selecting, based at least in part on the current location of the network device identified in the signed geo-location information, a configuration profile that modifies the configuration of the network device to account for the current location of the network device; and
         pushing the configuration profile to the network device;
   receives the configuration profile from the remote management system in response to providing the signed geo-location information and the signed time information to the remote management system; and modifies the configuration of the network device based at least in part on the configuration profile to account for the current location of the network device.

2. The apparatus of claim 1, wherein:
the network device is connected over a local area network to an additional network device that does not have independent access to the geo-location information; and
the remote management system further manages the configuration of the additional network device based at least in part on the geo-location information.

3. The apparatus of claim 2, wherein the network device:
receives a unique identifier of the additional network device;
provides the unique identifier along with the signed geo-location information of the network device to the remote management system that manages the configuration of the additional network device based at least in part on the geo-location information;
receives, from the remote management system and in response to providing the unique identifier along with the signed geo-location information to the remote management system, a configuration profile that modifies the configuration of the additional network device to account for the current location of the additional network device; and
provides the configuration profile to the additional network device.

4. The apparatus of claim 2, wherein the network device:
receives a request for the geo-location information from the additional network device; and
provides the geo-location information to the additional network device to enable the additional network device to request a configuration profile from the remote management system.

5. The apparatus of claim 1, wherein the network device obtains the geo-location information during a boot-up process executed in response to a power-on event.

6. The apparatus of claim 1, wherein the network device provides the signed time information to the remote management system to at least one of:
prevent one or more replay attacks; and
enforce one or more time-based security policies.

7. The apparatus of claim 1, wherein the encryption device comprises a trusted platform module.

8. The apparatus of claim 1, wherein:
the remote management system comprises a Dynamic Host Configuration Protocol (DHCP) server; and
the configuration profile comprises an Internet Protocol (IP) address.

9. The apparatus of claim 1, wherein the geo-location information comprises Global Positioning System (GPS) coordinates.

10. A system comprising:
a Trusted Platform Module (TPM) that signs information exchanged between network devices to ensure the integrity of the information; and
a router communicatively coupled to TPM, wherein the router:
obtains geo-location information that identifies a current location of the router;
directs the TPM to sign:
the geo-location information that identifies the current location of the router to ensure the integrity of the geo-location information; and
time information that identifies a current time at the current location of the network device;
provides the signed geo-location information and the signed time information to a remote management system that manages the configuration of the router by:
verifying the authenticity of the signed geo-location information;
verifying the authenticity of the signed time information by determining that the current time identified in the signed time information is consistent with a current time at the current location of the network device; and
in response to verifying the authenticity of the signed geo-location information and the signed time information:
selecting, based at least in part on the current location of the router identified in the signed geo-location information, a configuration profile that modifies the configuration of the router to account for the current location of the router; and
pushing the configuration profile to the router;
receives the configuration profile from the remote management system in response to providing the signed geo-location information and the signed time information to the remote management system; and
modifies the configuration of the router based at least in part on the configuration profile to account for the current location of the router.

11. The system of claim 10, wherein:
the router is connected over a local area network to an additional router that does not have independent access to the geo-location information; and
the remote management system further manages the configuration of the additional router based at least in part on the geo-location information.

12. The system of claim 11, wherein the router:
receives a unique identifier of the additional router;
provides the unique identifier along with the signed geo-location information of the additional router to the remote management system that manages the configuration of the additional router based at least in part on the geo-location information;
receives, from the remote management system and in response to providing the unique identifier along with the signed geo-location information to the remote management system, a configuration profile that modifies the configuration of the additional router to account for the current location of the additional router; and
provides the configuration profile to the additional router.

13. The system of claim 11, wherein the router:
receives a request for the geo-location information from the additional router; and
provides the geo-location information to the additional router to enable the additional router to request a configuration profile from the remote management system.

14. The system of claim 10, wherein the router obtains the geo-location information during a boot-up process executed in response to a power-on event.

15. The system of claim 10, wherein the router provides the signed time information to the remote management system to at least one of:
prevent one or more replay attacks; and
enforce one or more time-based security policies.

16. The system of claim 10, wherein:
the remote management system comprises a Dynamic Host Configuration Protocol (DHCP) server; and the configuration profile comprises an Internet Protocol (IP) address.

17. The system of claim 10, wherein the geo-location information comprises Global Positioning System (GPS) coordinates.

18. A method comprising:
obtaining geo-location information that identifies a current location of a network device;
directing an encryption device to sign:
the geo-location information that identifies the current location of the network device to ensure the integrity of the geo-location information; and
time information that identifies a current time at the current location of the network device;
providing the signed geo-location information and the signed time information to a remote management system that manages the configuration of the network device by:
verifying the authenticity of the signed geo-location information;
verifying the authenticity of the signed time information by determining that the current time identified in the signed time information is consistent with a current time at the current location of the network device; and
in response to verifying the authenticity of the signed geo-location information and the signed time information:
selecting, based at least in part on the current location of the network device identified in the signed geo-location information, a configuration profile that modifies the configuration of the network device to account for the current location of the network device; and
pushing the configuration profile to the network device; and
receiving the configuration profile from the remote management system in response to providing the signed geo-location information and the signed time information to the remote management system; and
modifying the configuration of the network device based at least in part on the configuration profile to account for the current location of the network device.

19. The method of claim 18, further comprising:
receiving a unique identifier of an additional network device;
providing the unique identifier along with the signed geo-location information of the network device to the remote management system that manages the configuration of the additional network device based at least in part on the geo-location information;
receiving, from the remote management system and in response to providing the unique identifier along with the signed geo-location information to the remote management system, a configuration profile that modifies the configuration of the additional network device to account for the current location of the additional network device; and
providing the configuration profile to the additional network device.

20. The method of claim 18, further comprising:
receiving a request for the geo-location information from an additional network device; and
providing the geo-location information to the additional network device to enable the additional network device to request a configuration profile from the remote management system.

* * * * *